Patented Nov. 16, 1937

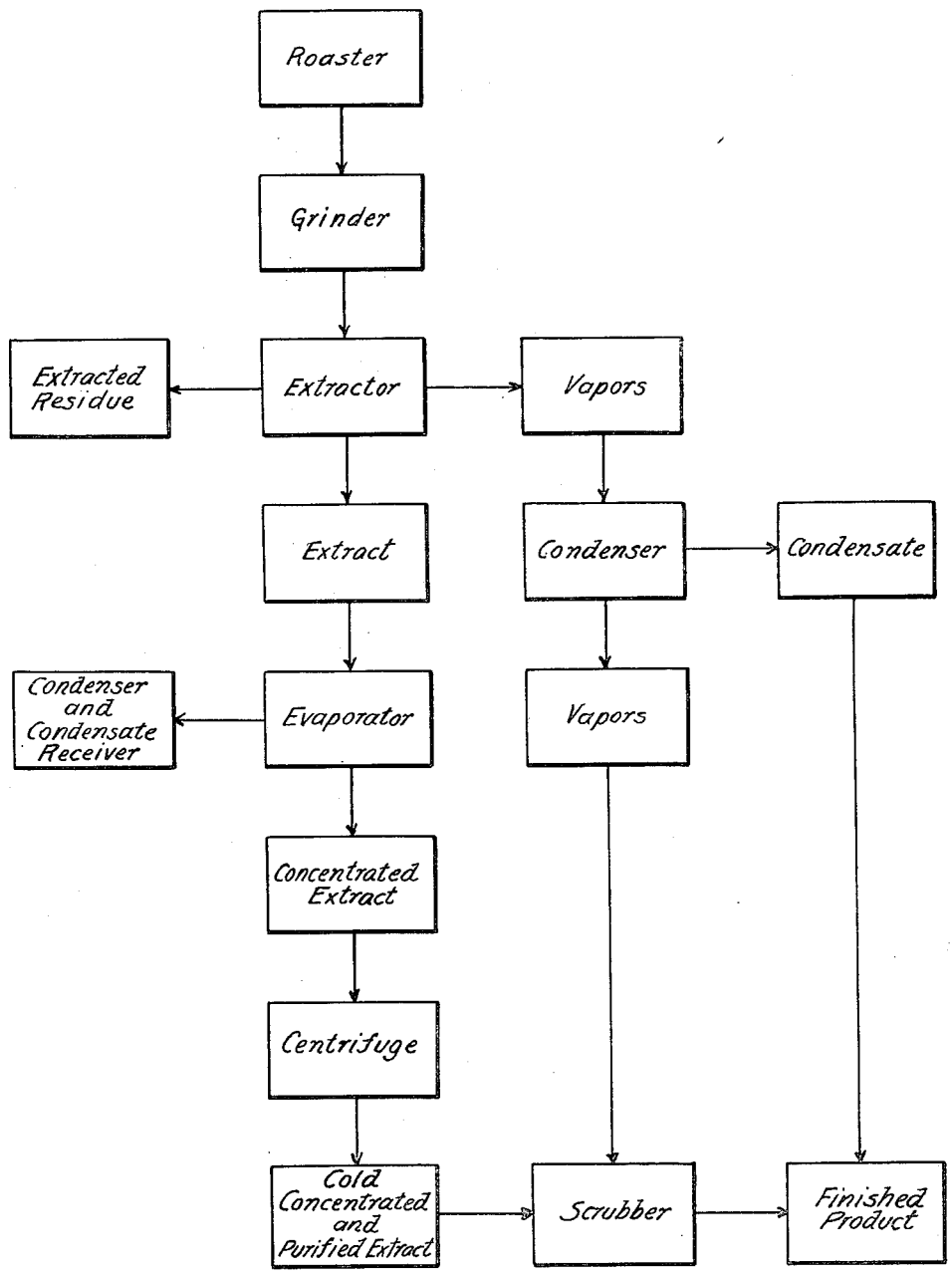

2,098,961

UNITED STATES PATENT OFFICE 2,098,961

MANUFACTURE OF CONCENTRATED COFFEE EXTRACT

Douglas Fronmuller, Middle Village, N. Y., assignor to Coffee Products Corporation, New York, N. Y., a corporation of New York Application July 3, 1934, Serial No. 733,558

4 Claims. (Cl. 99—71)

This invention relates to an improved method for the manufacture of a concentrated coffee extract which will have an aroma and flavor comparable to freshly brewed coffee infusion.

According to the present invention, the roasted and ground coffee, advantageously used in a freshly roasted and freshly ground state, is extracted with hot or boiling water, the resulting extract is concentrated and purified, and the volatile and aromatic constituents of the coffee that are ordinarily vaporized and lost during the extraction of the ground roasted coffee with hot or boiling water are recovered by cooling the vapors from the extraction to condense readily condensable constituents therefrom, then scrubbing the remaining vapors with the cold concentrated extract to recover volatile flavor constituents therefrom, and adding to the resulting extract the condensed constituents, condensed from the vapors given off during the extraction operation.

I have found that a very marked improvement in the flavor of liquid coffee extract results from the recovery of the volatile and gaseous materials, given off during the extraction with hot or boiling water, and their incorporation with the finished concentrated coffee extract. The recovery and absorption of these volatile and gaseous aromatic constituents restores to the extract a desirable balance of flavors in the coffee, and gives to the finished concentrated extract an aroma and flavor comparable to that of freshly brewed coffee infusion.

In carrying out the process the coffee is best used in a freshly roasted and freshly ground condition, thereby minimizing losses of readily volatile constituents, and using the ground roasted coffee while it contains practically its maximum content of volatile aromatic constituents, after roasting and grinding.

The extraction of the ground roasted beans is carried out with hot or boiling water, in an extraction tank, urn or percolator, or other suitable extraction apparatus, but the apparatus employed is a completely closed system, equipped with a tight-fitting cover to avoid loss of volatile and aromatic constituents to the atmosphere, and this apparatus is provided with a pipe leading to a condenser so that all vapors given off during the extraction will be subjected to condensation, for example, in an ordinary water cooled condenser, where readily condensable constituents are condensed from the gases and vapors and collected in liquid form in a suitable receiver made of glass, or glass lined, or of other suitable material.

After the vapors given off during the extraction are thus cooled and subjected to condensation, the remaining uncondensed vapors and gases, and which contain valuable volatile and aromatic constituents given off from the coffee, are passed to an absorption tower where their valuable constituents are absorbed in the finished cold concentrated liquid coffee. This scrubbing or absorption tower is advantageously of a countercurrent construction such that a prolonged contact is provided between the gases and vapors passing up through the apparatus and the cold concentrated liquid passing downwardly therethrough, for example, over plates or bubble-cap arrangement for securing intimate contact of the descending liquid with the ascending gases and vapors. During this contact the uncondensed and non-condensable gases and vapors are largely or completely dissolved in the cold concentrated liquid coffee so that little or no coffee aroma escapes from the top of the tower.

The liquid coffee drawn off from the bottom of the absorption tower, and enriched by the absorbed and dissolved aromatic gases and vapors, then has added to it the liquid condensate produced in the condenser and collected in the receiver.

In carrying out the process, the rates of flow are advantageously so adjusted that the liquid coffee used in the absorption tower, and there enriched by the absorption of gases and vapors, and by the addition of the condensate thereto, corresponds exactly or closely in amount with the amount of liquid coffee that is being made from the coffee beans in the extractor which are the source of both the condensate and the gases. By thus balancing the operation, each pound of roasted coffee beans extracted has the volatile constituents and aroma given off during extraction absorbed in an equivalent quantity of concentrated liquid coffee extract.

I have found it important to restore to the concentrated coffee extract both the condensate, formed on cooling and condensing the vapors given off during extraction, and also the uncondensed volatile and aromatic constituents which are absorbed in the cold concentrated extract during the absorption operation, since both the condensate and the uncondensed constituents seem to be necessary in order to give a product that has a full coffee flavor. Neither the condensate nor the uncondensed and subsequently absorbed gases are able, by themselves, to restore a flavor to the coffee comparable to the original flavor, but the combination of both the condensate and the uncondensed but absorbed constituents, in their proper proportions, gives to the finished product an excellent resemblance to the full coffee flavor of freshly made infusion.

The readily volatile constituents of concentrated coffee extracts are considerably increased by the present process. I have found that a concentrated coffee extract prepared by the present process contains a much larger proportion of constituents volatilizing below the boiling point of water than an extract identical in all respects except that it has not incorporated in it the constituents vaporized during extraction or infusion of the roasted coffee by hot water.

The concentrating of the liquid extract, to prepare a concentrated extract, is accompanied with some loss of volatile constituents, which can also advantageously be recovered, for example, by the addition of a small amount of glycerin to the extract before concentrating, as set forth in the Wendt Patent No. 1,925,159, and in the Wendt application Serial No. 687,887 filed September 1, 1933. It is not necessary, however, to recover volatile constituents given off during the concentration, although desirable to do so, since the recovery of the volatile and aromatic constituents given off during the extraction, by recovering these in the cold concentrated extract, gives to the concentrated extract the desirable coffee flavor and aroma, making it available as an improved product.

The invention will be further illustrated by reference to the accompanying drawing, showing in a conventional and diagrammatic manner a flow sheet of the various operations.

The coffee passes from the roaster, preferably in a freshly roasted condition, to the grinder, and then to the extractor, which thus can act on the freshly roasted and freshly ground coffee which retains practically the maximum of volatile and aromatic constituents. The extraction is carried out with hot or boiling water in the ordinary or any suitable way, but in a closed apparatus such that all vapors and gases given off are passed to a condenser where condensation of readily condensible constituents takes place, and from which the condensate is drawn off to be subsequently added to the final concentrated extract. The uncondensed vapors and gases leaving the condenser then go to the scrubber.

The extract from the extraction of the coffee is evaporated, preferably in a vacuum evaporator at a low temperature, to produce a concentrated extract, and the water given off is passed to a condenser.

The concentrated extract can be used as produced, or it is better subjected to filtration to remove suspended impurities. It contains more or less oils or fats which, if contained in the final concentrate, tend to become rancid on standing. These oils and fats are advantageously removed by subjecting the concentrated extract to a centrifugal treatment, which treatment also removes other suspended constituents, and gives a concentrated and purified extract.

It is this concentrated and purified extract, in a cold state, which is used in the scrubber for scrubbing and absorbing the uncondensed vapors and gases, and to which the condensate above referred to is added, thereby supplying to the cold concentrated extract both the condensed constituents recovered from the extraction vapors and the uncondensed constituents which are absorbed and dissolved in the cold liquid during the scrubbing operation.

The particular methods of carrying out the extraction of the ground roasted coffee with hot or boiling water, and the particular method of concentrating and treating the extract to produce a concentrated extract, can be varied, and are not, in themselves, distinctive in the present process. The extraction, however, should be carried out in a closed system permitting recovery of volatile and aroma constituents, and the extractor should be provided with a condenser for cooling the vapors and condensing readily condensable constituents therefrom. So also, a scrubber is provided, and so connected that the cold concentrated extract is used as the scrubbing medium for directly absorbing the volatile materials from the extraction vapors, as above described.

While I have described and illustrated a separate condenser, separate from and preceding the scrubbing tower or absorber, the cooling and condensation of the vapors and the final absorption can be combined in a single operation, with suitable cooling of the gases and vapors to insure condensation of condensable constituents, and with avoidance of heating of the cold concentrated extract, as by supplying additional cooling means for cooling the gases and vapors going to the bottom of the scrubber, or by providing cooling means in the bottom of the scrubber to insure cooling and condensation of the vapors, and avoidance of heating of the concentrated liquid thereby.

The present process involves only minor changes in equipment, as compared with ordinary extraction methods, but nevertheless enables the valuable volatile and aroma constituents from the extraction operation to be recovered and made available in the finished concentrated coffee extract in a simple and advantageous manner, and with the production of an improved product.

I claim:

1. The improvement in the production of a concentrated liquid coffee extract from roasted coffee, which comprises extracting the ground, roasted coffee with hot or boiling water in a closed system to produce a coffee extract, concentrating the resulting coffee extract to an extent sufficient to produce a more concentrated liquid extract than that desired as the final product and cooling the concentrated extract, drawing off the vapors produced during the extraction and subjecting the same to a cooling and condensing treatment and also to a scrubbing treatment, the scrubbing treatment being carried out by using the super-concentrated cold liquid coffee extract as the scrubbing liquid and the condensed constituents, condensed from the vapors by the cooling and condensing treatment, being combined with the super-concentrated liquid coffee extract to give a concentrated cold liquid coffee extract containing the condensed constituents and also containing difficultly condensable and non-condensable constituents scrubbed from the vapors during such scrubbing treatment.

2. The improvement in the production of a concentrated liquid coffee extract which comprises extracting ground roasted coffee with hot or boiling water in a closed system to produce a coffee extract, concentrating the coffee extract to a concentrated liquid extract and cooling the concentrated extract, drawing off the vapors produced during the extraction and cooling the same to condense readily condensable constituents therefrom, then subjecting the remaining uncondensed vapors and gases to absorption in the cold concentrated liquid extract, and adding to such extract the condensate resulting from the cooling and condensation of such vapors.

3. The improvement in the production of a concentrated liquid coffee extract which comprises extracting freshly roasted and ground coffee in a closed extraction system in hot or boiling water, drawing off the vapors given off during the extraction and cooling the same in a condenser to condense readily condensable constituents therefrom, concentrating the coffee extract produced by the extraction to form a concentrated liquid coffee extract, cooling the concentrated extract, and scrubbing with such cold concentrated liquid extract the vapors and gases remaining after condensation of readily condensable constituents therefrom in the condensation above referred to, and combining with the resulting extract the condensate produced by such condensation.

4. The improvement in the production of a concentrated liquid coffee extract which comprises extracting roasted ground coffee with hot or boiling water in a closed system to produce a coffee extract, concentrating the coffee extract to a concentrated liquid extract and cooling the concentrated extract, drawing off the vapors produced during the extraction and subjecting the same to a combined cooling and scrubbing treatment to effect condensation of condensable constituents therefrom and absorption of absorbable constituents, the liquid used for such absorption being the cold concentrated liquid coffee extract which thus has the condensed and absorbed constituents incorporated therein.

DOUGLAS FRONMULLER.